US012766957B2

(12) United States Patent
Hara et al.

(10) Patent No.: US 12,766,957 B2
(45) Date of Patent: Oct. 20, 2026

(54) VEHICLE MANAGEMENT SYSTEM AND BATTERY ELECTRIC VEHICLE WITH SOUND EFFECT OUTPUT BASED ON YAW RATE

(71) Applicant: TOYOTA JIDOSHA KABUSHIKI KAISHA, Toyota (JP)

(72) Inventors: Yoshikazu Hara, Atsugi (JP); Tomio Yamanaka, Nagoya (JP); Hiroshi Hiraiwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 18/951,227

(22) Filed: Nov. 18, 2024

(65) Prior Publication Data

US 2025/0196640 A1 Jun. 19, 2025

(30) Foreign Application Priority Data

Dec. 19, 2023 (JP) ................................ 2023-213831

(51) Int. Cl.
*B60K 35/26* (2024.01)
*B60K 35/10* (2024.01)
*B60R 16/037* (2006.01)

(52) U.S. Cl.
CPC .............. *B60K 35/26* (2024.01); *B60K 35/10* (2024.01); *B60R 16/037* (2013.01)

(58) Field of Classification Search
CPC ........ B60K 35/26; B60K 35/10; B60R 16/037
See application file for complete search history.

(56) References Cited

U.S. PATENT DOCUMENTS

| | | | | |
|---|---|---|---|---|
| 11,302,299 B2 * | 4/2022 | Loh | H04R 1/028 |
| 12,145,503 B2 * | 11/2024 | Duo' | B60Q 5/008 |
| 2012/0257763 A1 * | 10/2012 | Bowden | G10K 11/17823 381/71.4 |
| 2015/0199955 A1 * | 7/2015 | Draganic | G08B 6/00 381/86 |
| 2018/0090125 A1 * | 3/2018 | Yeung | B60Q 9/00 |
| 2018/0268804 A1 * | 9/2018 | Niibe | H04R 3/00 |
| 2018/0277091 A1 * | 9/2018 | Niibe | B60W 50/14 |
| 2019/0111841 A1 * | 4/2019 | Yamanashi | B60W 30/143 |
| 2021/0118421 A1 * | 4/2021 | Bastyr | H04R 3/00 |
| 2021/0343268 A1 * | 11/2021 | Loh | H04R 3/00 |
| 2022/0063494 A1 | 3/2022 | Duo' et al. | |

(Continued)

FOREIGN PATENT DOCUMENTS

| | | |
|---|---|---|
| JP | 2007-011503 A | 1/2007 |
| JP | 2011-215437 A | 10/2011 |

(Continued)

*Primary Examiner* — Ramsey Refai

(74) *Attorney, Agent, or Firm* — Finnegan, Henderson, Farabow, Garrett and Dunner, LLP

(57) ABSTRACT

A vehicle management system is applied to a battery electric vehicle including an electric motor as a driving source. The vehicle management system includes one or more processors configured to generate a pseudo-engine sound and output the pseudo-engine sound from a speaker installed in the battery electric vehicle. The one or more processors are configured to, when the battery electric vehicle turns, output from the speaker a sound effect that varies in response to a yaw rate of the battery electric vehicle as superimposed on the pseudo-engine sound.

13 Claims, 9 Drawing Sheets

(56) References Cited

U.S. PATENT DOCUMENTS

| | | | |
|---|---|---|---|
| 2023/0146799 | A1 | 5/2023 | Kim et al. |
| 2023/0294601 | A1 | 9/2023 | Kim et al. |

FOREIGN PATENT DOCUMENTS

| | | | |
|---|---|---|---|
| JP | 2016-150600 | A | 8/2016 |
| JP | 2022-036005 | A | 3/2022 |
| JP | 2022-036834 | A | 3/2022 |
| KR | 10-2023-0069307 | A | 5/2023 |

* cited by examiner

VEHICLE MANAGEMENT SYSTEM AND BATTERY ELECTRIC VEHICLE WITH SOUND EFFECT OUTPUT BASED ON YAW RATE

CROSS-REFERENCE TO RELATED APPLICATION

This application claims priority to Japanese Patent Application No. 2023-213831 filed on Dec. 19, 2023, incorporated herein by reference in its entirety.

BACKGROUND

1. Technical Field

This disclosure relates to a battery electric vehicle having an electric motor as a driving source.

2. Description of Related Art

As a driving sound of an electric motor is small, a driver who drives a battery electric vehicle usually has few opportunities to feel the driving state of the battery electric vehicle by sound. Further, in recent years, various technologies that enhance quietness inside a vehicle cabin (e.g., the technology disclosed in Japanese Unexamined Patent Application Publication No. 2016-150600 (JP 2016-150600 A)) have been increasingly applied to battery electric vehicles. While sound generated during driving provides drivers with a certain kind of enjoyment, in normal battery electric vehicles, it has thus become difficult for drivers to enjoy driving battery electric vehicles by sound.

In recent years, therefore, technologies have been explored that generate in a battery electric vehicle a pseudo-engine sound that assumes a virtual engine vehicle having an engine (internal combustion engine) as a driving source. For example, JP 2022-036005 A discloses a control device of a vehicle including a controller that infers a pseudo-engine sound (virtual sound) generated inside a vehicle cabin when a virtual engine is controlled in response to a driving operation, and controls an audio device so as to generate the inferred pseudo-engine sound.

SUMMARY

Generating a pseudo-engine sound in a battery electric vehicle allows the driver to feel the driving state relating to a propulsive action of the battery electric vehicle by sound. Thus, the driver is provided with an opportunity to enjoy driving the battery electric vehicle by sound. Incidentally, battery electric vehicles sometimes perform not only the propulsive action but also a turning action. However, generating only a pseudo-engine sound as in the related art does not allow the driver to feel the driving state relating to the turning action by sound. If the driver can feel the driving state relating to the turning action as well by sound, the driver would be able to better enjoy driving the battery electric vehicle by sound.

A first aspect of this disclosure relates to a vehicle management system applied to a battery electric vehicle including an electric motor as a driving source. The vehicle management system includes one or more processors configured to generate a pseudo-engine sound and output the pseudo-engine sound from a speaker installed in the battery electric vehicle. When the battery electric vehicle turns, the one or more processors output from the speaker a sound effect that varies in response to a yaw rate of the battery electric vehicle as superimposed on the pseudo-engine sound.

A second aspect of this disclosure relates to a battery electric vehicle including an electric motor as a driving source. The battery electric vehicle includes a speaker, and one or more processors configured to generate a pseudo-engine sound and output the pseudo-engine sound from the speaker. When the battery electric vehicle turns, the one or more processors output from the speaker a sound effect that varies in response to a yaw rate of the battery electric vehicle as superimposed on the pseudo-engine sound.

According to this disclosure, when the battery electric vehicle turns, the sound effect that varies in response to the yaw rate of the battery electric vehicle is output from the speaker as superimposed on the pseudo-engine sound. Thus, the sound output from the speaker varies in response to both the driving state relating to the propulsive action of the battery electric vehicle and the driving state relating to the turning action thereof. Therefore, while driving the battery electric vehicle, the driver can also feel the driving state relating to the turning action by sound. As a result, the driver can better enjoy driving the battery electric vehicle by sound.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

An embodiment of this disclosure will be described with reference to the accompanying drawings.

1. Battery Electric Vehicle and Vehicle Management System

Figure 1:
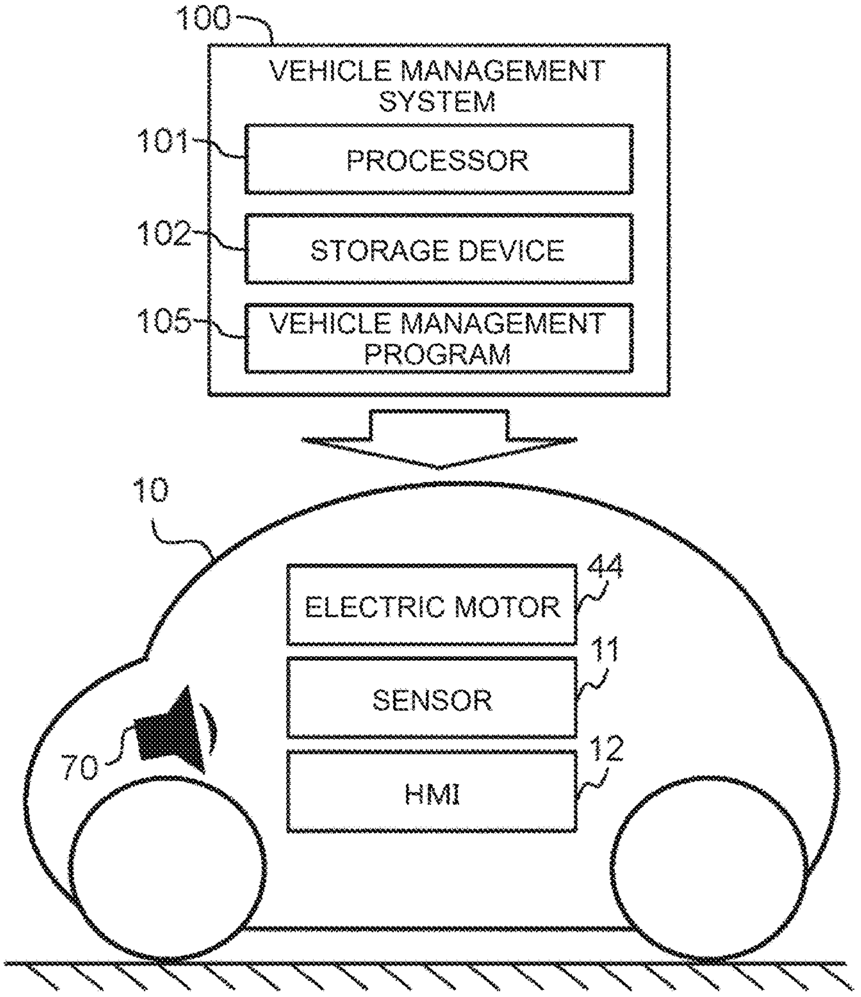
FIG. 1 is a conceptual view showing a battery electric vehicle and a vehicle management system according to an embodiment.

FIG. 1 is a conceptual view showing a battery electric vehicle 10 and a vehicle management system 100 according to the embodiment. The battery electric vehicle 10 has an electric motor 44 as a driving source. Examples of the electric motor 44 include a brushless DC motor and a three-phase alternating-current synchronous motor. The battery electric vehicle 10 uses the electric motor 44 as a motive power device for traveling.

The battery electric vehicle 10 includes various sensors 11. The various sensors 11 detect a driving state of the battery electric vehicle 10. Examples of the various sensors 11 include an accelerator position sensor, a brake position sensor, a steering angle sensor, a steering torque sensor, a wheel speed sensor, an acceleration sensor, a gyro sensor, an inertial measurement unit (IMU), a rotation speed sensor, a position sensor, and a recognition sensor. The accelerator position sensor detects an amount of operation of an accelerator pedal. The brake position sensor detects an amount of operation of a brake pedal. The steering angle sensor detects a steering angle of a steering wheel. The steering torque sensor detects a steering torque of the steering wheel. The wheel speed sensor detects a rotation speed of a wheel of the battery electric vehicle 10. The acceleration sensor detects a lateral acceleration and a front-rear acceleration of the battery electric vehicle 10. The gyro sensor detects a yaw angle and a yaw rate of the battery electric vehicle 10. The IMU detects an angle, an angular speed, and an acceleration relating to each of three axes of the battery electric vehicle 10. The rotation speed sensor detects a rotation speed of the electric motor 44. The position sensor detects a position of the battery electric vehicle 10. One example of position sensors is a global navigation satellite system (GNSS) sensor. The recognition sensor is a sensor for recognizing (detecting) conditions around the battery electric vehicle 10. Examples of recognition sensors include a camera, a light detection and ranging (lidar), and a radar.

The battery electric vehicle 10 is equipped with one or more speakers 70. For example, the speaker 70 is an in-vehicle speaker that outputs sound inside a vehicle cabin of the battery electric vehicle 10. As another example, the speaker 70 may be an extra-vehicle speaker that outputs sound to an outside of the battery electric vehicle 10. The battery electric vehicle 10 may include both an in-vehicle speaker and an extra-vehicle speaker.

The battery electric vehicle 10 includes a human-machine interface (HMI) 12 as an interface with a user. The HMI 12 presents various pieces of information to the user by display or sound and receives various inputs from the user. The HMI 12 is composed of a display (e.g., a multi-information display, a meter display), switches, a speakerphone, a touch panel, etc. The speaker 70 may be configured as a part of the HMI 12.

The vehicle management system 100 is applied to such a battery electric vehicle 10 and manages the battery electric vehicle 10. The entire vehicle management system 100 may be installed in the battery electric vehicle 10. As another example, at least part of the vehicle management system 100 may be included in a management server outside the battery electric vehicle 10. In that case, the vehicle management system 100 may remotely manage the battery electric vehicle 10. As yet another example, the vehicle management system 100 may be divided between the battery electric vehicle 10 and the management server.

In general, the vehicle management system 100 includes one or more processors 101 (hereinafter referred to simply as the processor 101), and one or more storage devices 102 (hereinafter referred to simply as the storage device 102). The processor 101 executes various processes. The processor 101 is formed by a general-purpose processor, a special-purpose processor, a central processing unit (CPU), a graphics processing unit (GPU), an application-specific integrated circuit (ASIC), a field-programmable gate array (FPGA), an integrated circuit, a conventional circuit, etc. The processor 101 can also be called a circuitry or a processing circuitry. A circuitry is hardware programmed to realize each function to be described below, or hardware that executes each function. The storage device 102 stores (contains) various pieces of information. Examples of the storage device 102 include a volatile memory, a non-volatile memory, a hard disk drive (HDD), and a solid-state drive (SSD). The functions of the vehicle management system 100 are realized by cooperation between the processor 101 and the storage device 102.

One or more vehicle management programs 105 (hereinafter referred to simply as the vehicle management program 105) are computer programs that are executed by the processor 101. The functions of the vehicle management system 100 may be realized by cooperation between the processor 101 that executes the vehicle management program 105 and the storage device 102. The vehicle management program 105 is contained in the storage device 102. Or the vehicle management program 105 may be recorded in a computer-readable recording medium.

For example, the vehicle management system 100 includes a function as a sound management system that manages sound relating to the battery electric vehicle 10. As the function of the sound management system, the vehicle management system 100 generates and manages sound output from the speaker 70 installed in the battery electric vehicle 10. In particular, the vehicle management system 100 generates a "pseudo-engine sound" simulating an engine sound that is generated in an engine vehicle having an engine (internal combustion engine) as a driving source. Then, the vehicle management system 100 outputs the pseudo-engine sound from the speaker 70 installed in the battery electric vehicle 10.

Figure 2:
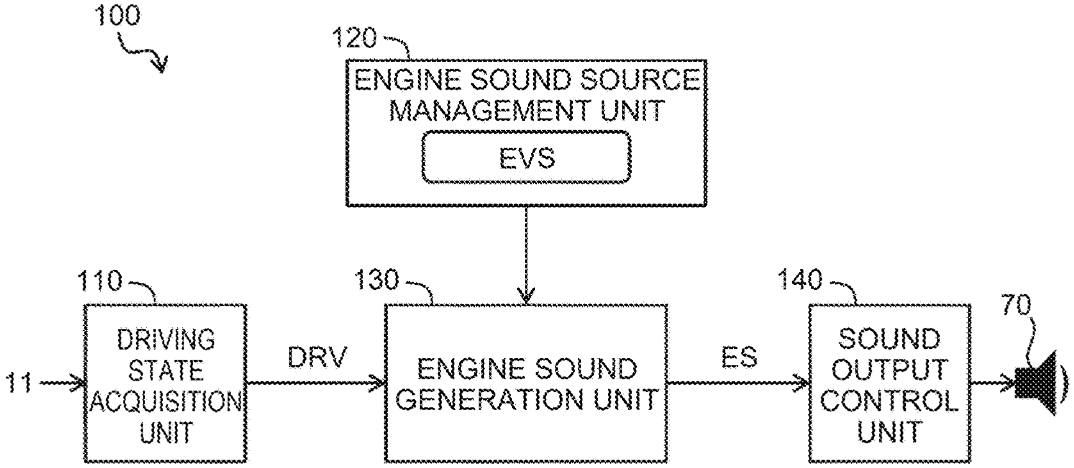
FIG. 2 is a conceptual view showing an example of the basic functional configuration of the vehicle management system.

FIG. 2 is a block diagram showing the basic functional configuration of the vehicle management system 100 as the sound management system. The vehicle management system 100 includes, as functional blocks, a driving state acquisition unit 110, an engine sound source management unit 120, an engine sound generation unit 130, and a sound output control unit 140. These functional blocks are realized by, for example, cooperation between the processor 101 that executes the vehicle management program 105 and the storage device 102.

The driving state acquisition unit 110 acquires driving state information DRV showing the driving state of the battery electric vehicle 10. The driving state information DRV includes information about a driver's driving operation, information about a traveling state of the battery electric vehicle 10, information about the conditions around the battery electric vehicle 10, etc. Typically, the driving state information DRV includes information detected by the various sensors 11 installed in the battery electric vehicle 10. For example, the driving state information DRV includes the amount of operation of the accelerator pedal (accelerator operation amount), the amount of operation of the brake pedal (brake operation amount), the steering angle, the steering speed, the steering torque, the wheel speed, the vehicle speed, the front-rear acceleration, the lateral acceleration, the yaw angle, the yaw rate, the rotation speed of the electric motor 44, and the like. The driving state information DRV may include information on the position of the battery electric vehicle 10. The driving state information DRV may include the conditions around the battery electric vehicle 10 recognized (detected) by the recognition sensor.

The driving state information DRV further includes virtual engine speed Ne. Here, it is assumed that the battery electric vehicle 10 uses a virtual engine as a motive power device for traveling. The virtual engine speed Ne is speed of the virtual engine on the assumption that the battery electric vehicle 10 is driven by the virtual engine. For example, the driving state acquisition unit 110 may calculate the virtual engine speed Ne so as to increase as the wheel speed increases. When the battery electric vehicle 10 is in a manual mode (MT mode) to be described later, the driving state acquisition unit 110 may acquire the virtual engine speed Ne in the manual mode. Details of the virtual engine speed Ne in the manual mode will be described later.

The engine sound source management unit 120 stores and manages sound source data EVS (engine sound source data EVS) that is used to generate the pseudo-engine sound. The engine sound source management unit 120 is realized mainly by the storage device 102. Typically, the engine sound source data EVS includes a plurality of types of sound source data. Examples of the plurality of types of sound source data include sound source data of sound attributable to engine combustion (for low speed, for medium speed, and for high speed), sound source data of sound attributable to a driving system, such as gears (for low speed, for medium speed, and for high speed), and sound source data of a noise sound. Each sound source data is generated beforehand through a simulation etc. based on an engine model or a vehicle model of an engine vehicle. Or each sound source data may be generated beforehand by recording sound that is generated in an actual engine vehicle. Each sound source data is flexibly adjustable. That is, at least either the sound pressure or the frequency of sound represented by the sound source data is flexibly adjustable.

The engine sound generation unit 130 (engine sound simulator) is a simulator that generates the pseudo-engine sound. The engine sound generation unit 130 acquires at least some pieces of the driving state information DRV from the driving state acquisition unit 110. In particular, the engine sound generation unit 130 acquires the driving state information DRV relating to a propulsive action of the battery electric vehicle 10 (the accelerator operation amount, the vehicle speed, the virtual engine speed Ne, etc.) from the driving state acquisition unit 110. The engine sound generation unit 130 reads in the engine sound source data EVS from the engine sound source management unit 120. Then, the engine sound generation unit 130 generates the pseudo-engine sound according to the driving state relating to the propulsive action of the battery electric vehicle 10 (the accelerator operation amount, the vehicle speed, the virtual engine speed Ne, etc.). The engine sound generation unit 130 transmits engine sound data ES for reproducing the generated pseudo-engine sound to the sound output control unit 140.

The technique of generating the pseudo-engine sound is not particularly limited in this embodiment. For example, a commonly known technique adopted in games etc. may be adopted. Another example is a technique that increases or decreases the frequency in proportion to the virtual engine speed Ne and increases or decreases the sound pressure in proportion to a virtual engine torque according to a virtual engine speed Ne vs. frequency map and a virtual engine torque vs. sound pressure map. In this case, the virtual engine torque may be calculated from the virtual engine speed Ne and the accelerator operation amount. Or when the battery electric vehicle 10 is in the manual mode (MT mode) to be described later, the virtual engine torque in the manual mode may be adopted. Details of the virtual engine torque in the manual mode will be described later.

Upon acquiring the engine sound data ES, the sound output control unit 140 outputs the pseudo-engine sound from the speaker 70 based on the engine sound data ES. When outputting the pseudo-engine sound, the sound output control unit 140 controls the sound pressure of the pseudo-engine sound by controlling an amplifier according to the engine sound data ES. In addition, the sound output control unit 140 varies the frequency of the pseudo-engine sound by controlling a frequency modulator (FMC) according to the engine sound data ES.

Figure 3:
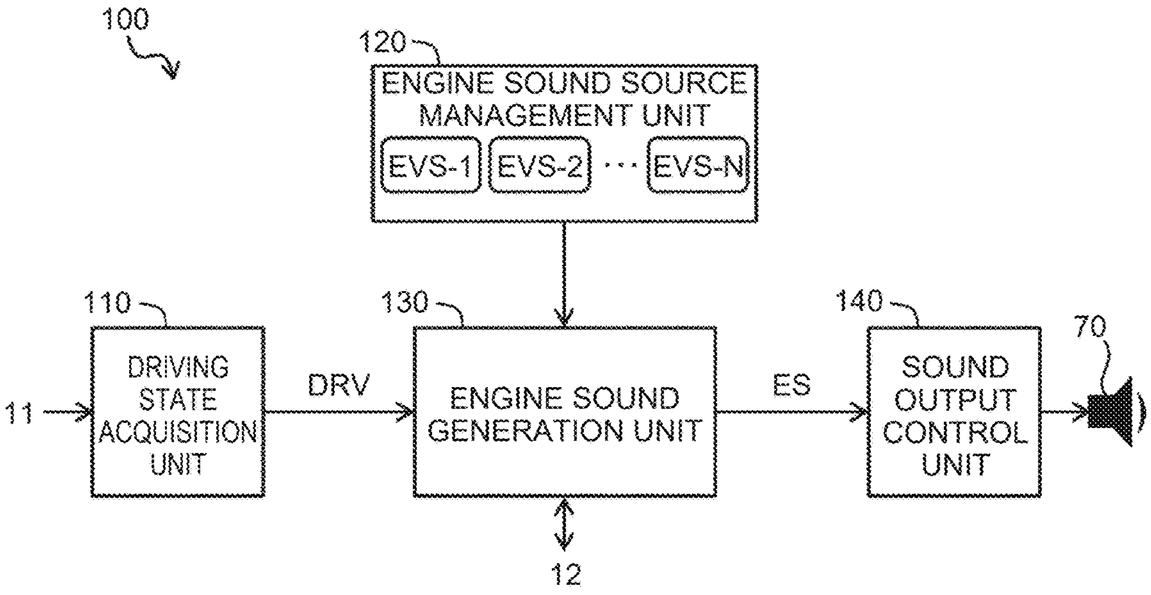
FIG. 3 is a conceptual view showing another example of the basic functional configuration of the vehicle management system.

FIG. 3 is a block diagram showing another example of the basic functional configuration of the vehicle management system 100. In the example shown in FIG. 3, the engine sound source management unit 120 stores and manages a plurality of types of engine sound source data EVS (EVS-1, EVS-2, . . . , EVS-N) corresponding to the respective vehicle types. Thus, in the example shown in FIG. 3, the engine sound source management unit 120 stores and manages the engine sound source data EVS for each vehicle type. Each engine sound source data EVS-i (i=1, 2, . . . , N) is generated beforehand through a simulation etc. based on an engine model or a vehicle model of the corresponding vehicle type. Or each engine sound source data EVS-i (i=1, 2, . . . , N) may be generated beforehand by recording sound that is actually generated in the corresponding vehicle type.

Regarding the pseudo-engine sound generated by the engine sound generation unit 130, the HMI 12 is configured to execute a process of receiving an input that specifies one among the plurality of vehicle types from the user of the battery electric vehicle 10. The user can specify the vehicle type of his or her preference among the plurality of vehicle types by operating the HMI 12 and performing a specification input. The engine sound generation unit 130 acquires engine sound source data EVS-k corresponding to the vehicle type specified by the user among the plurality of types of engine sound source data EVS. Then, the engine sound generation unit 130 generates the pseudo-engine sound from the acquired engine sound source data EVS-k. Thus, the user who is the driver can enjoy the pseudo-engine sound of the vehicle type of his or her preference.

In the following description, the functional configuration described in FIG. 2 is the basic functional configuration of the vehicle management system 100. Alternatively, in the following description, the functional configuration described in FIG. 3 can be adopted as the basic functional configuration of the vehicle management system 100.

2. Output of Sound According to Driving State Relating to Turning Action

As described above, the vehicle management system 100 according to the embodiment outputs the pseudo-engine sound from the speaker 70 installed in the battery electric vehicle 10. The pseudo-engine sound varies in response to the driving state relating to the propulsive action of the battery electric vehicle 10 (the accelerator operation amount, the vehicle speed, the virtual engine speed Ne, etc.). Thus, the pseudo-engine sound allows the driver to feel the driving state relating to the propulsive action of the battery electric vehicle 10 by sound. This provides the driver with an opportunity to enjoy driving the battery electric vehicle 10 by sound.

When the driver performs driving of the battery electric vehicle 10, the battery electric vehicle 10 sometimes performs not only the propulsive action but also a turning action. If the driver can feel the driving state relating to the turning action of the battery electric vehicle 10 as well by sound, the driver would be able to better enjoy driving the battery electric vehicle 10 by sound.

Therefore, the vehicle management system 100 according to this embodiment is further configured such that the sound output from the speaker 70 varies in response also to the driving state relating to the turning action of the battery electric vehicle 10. More specifically, the vehicle management system 100 has a function of, when the battery electric vehicle 10 turns, outputting from the speaker 70 a sound effect that varies in response to the yaw rate of the battery electric vehicle 10 as superimposed on the pseudo-engine sound. In the following, the configuration of the vehicle management system 100 relating to this function will be described in detail.

A case where particularly a pseudo-squeal sound simulating a squeal sound of a tire is adopted as the sound effect to be superimposed on the pseudo-engine sound will be described below. The squeal sound and the pseudo-squeal sound can be otherwise called a "slip sound" and a "pseudo-slip sound." The squeal sound is a distinctive sound relating to the turning action of a vehicle. Therefore, adopting the pseudo-squeal sound as the sound effect is expected to allow the driver to more clearly feel the driving state relating to the turning action by sound. In this embodiment, however, the sound effect to be superimposed on the pseudo-engine sound is not limited to the pseudo-squeal sound, and various sounds can be adopted. For example, the sound effect may be an artificial sound that goes off repeatedly or continuously in a certain scale, an artificial sound of playing a certain melody, an instrumental sound or an ambient sound in a certain tone, etc.

Figure 4:
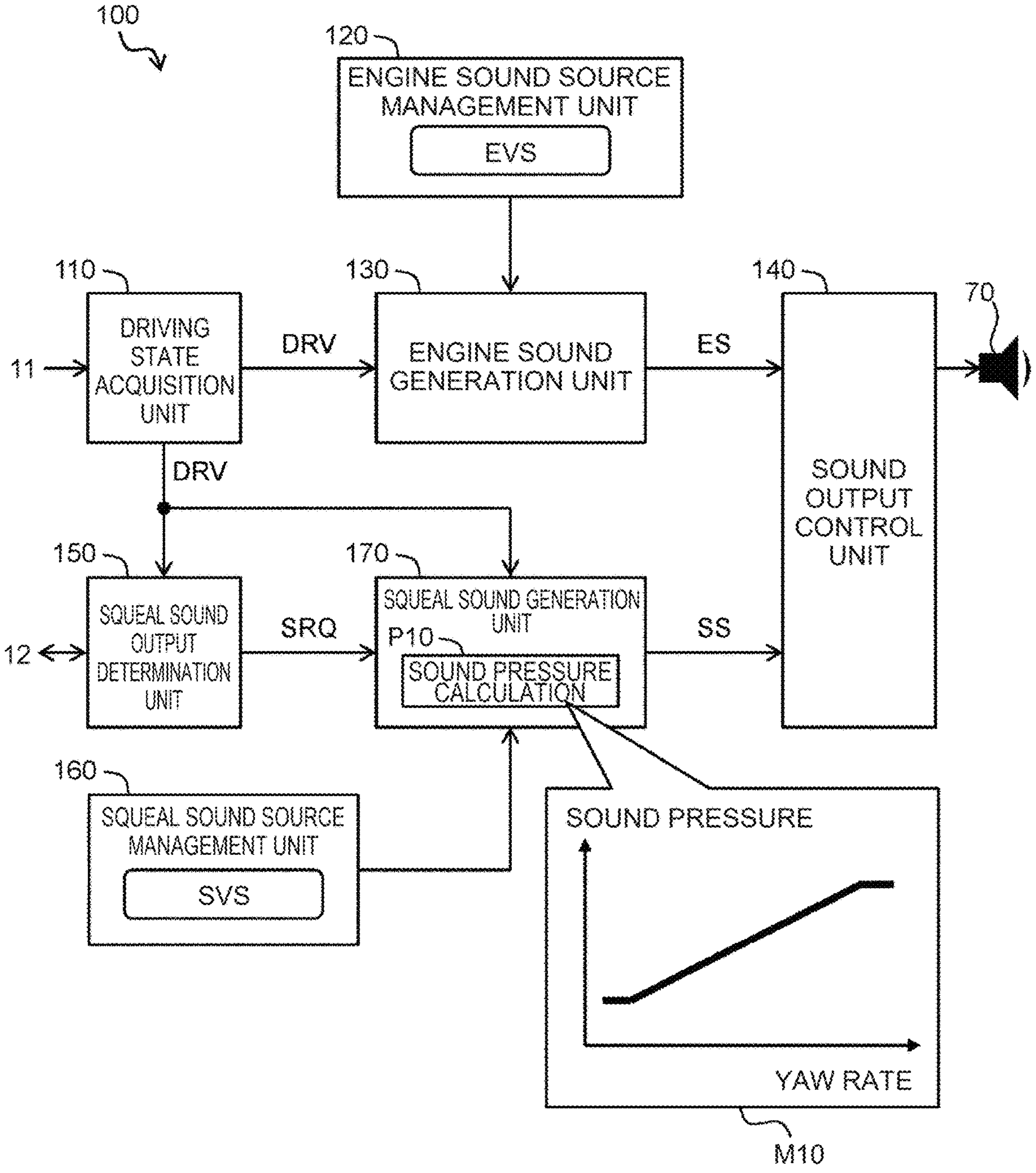
FIG. 4 is a block diagram showing an example of the functional configuration of the vehicle management system relating to a function of outputting a pseudo-squeal sound as superimposed on a pseudo-engine sound.

FIG. 4 is a block diagram showing an example of the functional configuration of the vehicle management system 100 relating to the function of outputting the pseudo-squeal sound as superimposed on the pseudo-engine sound. In the example shown in FIG. 4, the vehicle management system 100 further includes, in addition to the basic functional configuration described in FIG. 2, the functional blocks of a squeal sound output determination unit 150, a squeal sound source management unit 160, and a squeal sound generation unit 170. These functional blocks are realized by, for example, cooperation between the processor 101 that executes the vehicle management program 105 and the storage device 102.

The squeal sound output determination unit 150 acquires at least some pieces of the driving state information DRV from the driving state acquisition unit 110. In particular, the squeal sound output determination unit 150 acquires the vehicle speed and the yaw rate of the battery electric vehicle 10 from the driving state acquisition unit 110. Based on the acquired driving state information DRV, the squeal sound output determination unit 150 determines whether conditions for outputting the pseudo-squeal sound are met.

The conditions for outputting the pseudo-squeal sound include that the battery electric vehicle 10 is turning. For determining whether the battery electric vehicle 10 is turning, a commonly known suitable technique can be adopted. For example, the squeal sound output determination unit 150 determines whether the battery electric vehicle 10 is turning from a change in the yaw rate and the value of the yaw angle. Further, for example, the squeal sound output determination unit 150 determines whether the battery electric vehicle 10 is turning from the values of the steering angle and the lateral acceleration.

The conditions for outputting the pseudo-squeal sound further include that the vehicle speed of the battery electric vehicle 10 is equal to or higher than a specified speed and that the yaw rate of the battery electric vehicle 10 is equal to or higher than a specified threshold value. Thus, when the battery electric vehicle 10 is turning but the vehicle speed of the battery electric vehicle 10 is lower than the specified speed or the yaw rate of the battery electric vehicle is lower than the specified threshold value, the conditions for outputting the pseudo-squeal sound are not met. That is, the pseudo-squeal sound is not output. When the battery electric vehicle 10 is performing the turning action but is running slowly or turning to such an extent that the driver cannot physically sense it, a change in the sound output from the speaker 70 conversely causes an uncomfortable feeling to the driver. Therefore, the above conditions are included such that, as the pseudo-squeal sound is output, the driver can feel the driving state relating to the turning action by sound without an uncomfortable feeling.

In the above-described conditions, the specified vehicle speed and the specified threshold value may be set as appropriate according to an environment where this embodiment is applied. In particular, the squeal sound output determination unit 150 is configured to receive a request for changing the specified vehicle speed and the specified threshold value from the user of the battery electric vehicle 10 through the HMI 12. Upon receiving a request from the user, the squeal sound output determination unit 150 changes at least one of the specified vehicle speed and the specified threshold value in response to that request.

For example, the squeal sound output determination unit 150 manages the value of each of the specified vehicle speed and the specified threshold value for each mode as shown in the table below. The HMI 12 executes a process of receiving an input of selecting one of the plurality of modes from the user. When the user performs a selection input, the squeal sound output determination unit 150 changes the specified vehicle speed and the specified threshold value to values corresponding to the mode selected by the user. In the example shown in the table below, "basic" is a mode in which standard specified speed and specified threshold value are set. "Easy" is a mode in which the values of the specified speed and the specified threshold value are set lower than in "basic." Thus, when "easy" is selected, compared with "basic," the pseudo-squeal sound is output also for a gentler turning action. "Hard" is a mode in which the values of the specified speed and the specified threshold value are set higher than in "basic." Thus, when "hard" is selected, compared with "basic," the pseudo-squeal sound is not output unless the turning action is rather forceful. "Off" is a mode in which the values of the specified speed and the specified threshold value are set to be infinite. Thus, when "off" is selected, the pseudo-squeal sound is not output.

TABLE 1

| | | Specified speed [km/h] | Specified threshold value [deg/sec] |
|---|---|---|---|
| Mode | Basic | 40 | 20 |
| | Easy | 30 | 10 |

TABLE 1-continued

| | Specified speed [km/h] | Specified threshold value [deg/sec] |
|---|---|---|
| Hard | 50 | 30 |
| Off | inf | inf |

The above is one example of changing the specified vehicle speed and the specified threshold value, and the squeal sound output determination unit 150 may have a larger number of modes. Or the squeal sound output determination unit 150 may be configured to change the specified vehicle speed and the specified threshold value in response to a request from the user by other techniques. For example, the squeal sound output determination unit 150 may be configured to change each value of the specified vehicle speed and the specified threshold value to a value specified by a request from the user. The change of the value in this case may be performed stepwise or may be performed continuously.

Thus making the specified vehicle speed and the specified threshold value in the squeal sound output determination unit 150 changeable allows the user who is the driver to adapt the driving state in which the pseudo-squeal sound is output to his or her preference. Or this allows the driver to stop the output of the pseudo-squeal sound.

In this way, the squeal sound output determination unit 150 determines whether the conditions for outputting the pseudo-squeal sound are met. Then, when the squeal sound output determination unit 150 determines that the conditions for outputting the pseudo-squeal sound are met, the squeal sound output determination unit 150 transmits a request signal SRQ requesting the output of the pseudo-squeal sound to the squeal sound generation unit 170. The request signal SRQ may include information that specifies a reproduction time etc. of the pseudo-squeal sound. As described above, the conditions for outputting the pseudo-squeal sound do not assume a case where a squeal sound is actually generated from the vehicle. The pseudo-squeal sound is one example of the sound effect that varies in response to the yaw rate of the battery electric vehicle 10, and if the conditions are met, it is output regardless of slipping of a tire etc.

The squeal sound source management unit 160 stores and manages sound source data SVS (squeal sound source data SVS) that is used to generate the pseudo-squeal sound. The squeal sound source management unit 160 is realized mainly by the storage device 102. The squeal sound source data SVS is generated beforehand through a simulation etc. based on a vehicle model. Or the squeal sound source data SVS may be generated beforehand by recording a squeal sound that is generated in an actual vehicle.

Upon acquiring the request signal SRQ from the squeal sound output determination unit 150, the squeal sound generation unit 170 generates the pseudo-squeal sound. When generating the pseudo-squeal sound, the squeal sound generation unit 170 reads in the squeal sound source data SVS from the squeal sound source management unit 160. The squeal sound generation unit 170 acquires the yaw rate of the battery electric vehicle 10 among pieces of the driving state information DRV from the driving state acquisition unit 110. Then, using the squeal sound source data SVS, the squeal sound generation unit 170 generates the pseudo-squeal sound that varies in response to the yaw rate of the battery electric vehicle 10.

In particular, in this embodiment, the squeal sound generation unit 170 executes a sound pressure calculation process P10 of calculating the sound pressure of the pseudo-squeal sound. In the sound pressure calculation process P10, the sound pressure of the pseudo-squeal sound is calculated based on the yaw rate of the battery electric vehicle 10. Here, in the sound pressure calculation process P10, the sound pressure of the pseudo-squeal sound is calculated so as to become higher as the yaw rate becomes higher. For example, in the sound pressure calculation process P10, the sound pressure of the pseudo-squeal sound is calculated from the yaw rate using a sound pressure map M10. The sound pressure map M10 is created such that as the yaw rate becomes higher the sound pressure becomes higher.

By thus executing the sound pressure calculation process P10, the squeal sound generation unit 170 can generate the pseudo-squeal sound of which the sound pressure varies in response to the yaw rate of the battery electric vehicle 10. In particular, making the sound pressure higher as the yaw rate becomes higher allows the driver to easily feel a change in the driving state relating to the turning action by sound. Since the driver can recognize the extent of turning from the magnitude of the sound pressure, the driver is expected to drive the battery electric vehicle 10 while paying attention to the extent of turning. As a result, the safety of the driver's driving is expected to improve.

The squeal sound generation unit 170 transmits squeal sound data SS for reproducing the generated pseudo-squeal sound to the sound output control unit 140.

Upon acquiring the squeal sound data SS, the sound output control unit 140 outputs the pseudo-squeal sound based on the squeal sound data SS from the speaker 70 as superimposed on the pseudo-engine sound. When outputting the pseudo-squeal sound, the sound output control unit 140 controls the sound pressure of the pseudo-squeal sound by controlling the amplifier according to the squeal sound data SS.

Figure 5:
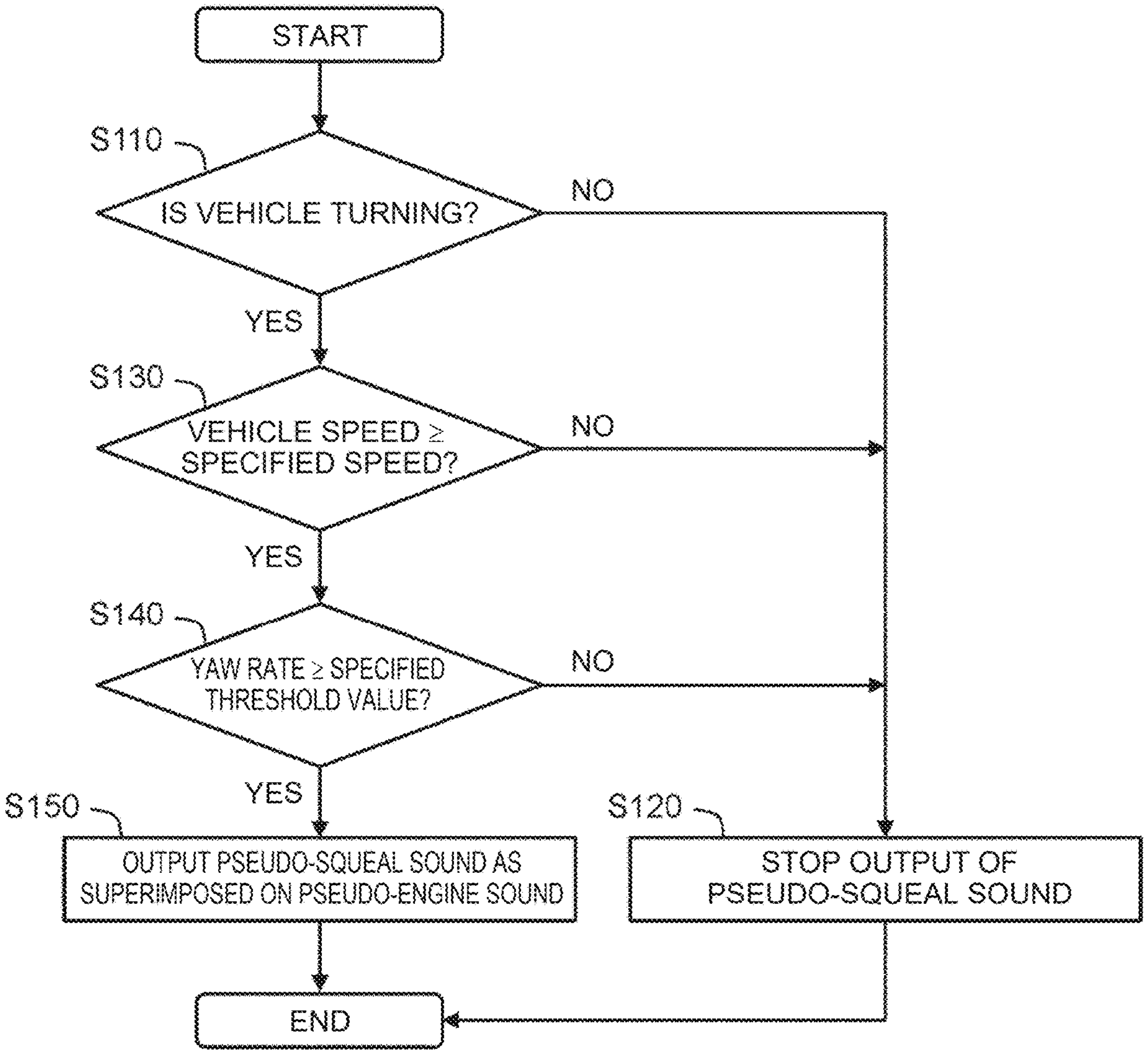
FIG. 5 is a flowchart showing one example of a processing flow of a process that the vehicle management system executes based on the functional configuration shown in FIG. 4.

Provided with such a functional configuration, the vehicle management system 100 can realize the function of outputting the pseudo-squeal sound as superimposed on the pseudo-engine sound. FIG. 5 is a flowchart showing one example of a processing flow of a process that the vehicle management system 100 executes based on the above-described functional configuration. The processing flow shown in FIG. 5 may be repeatedly executed on a predetermined processing cycle.

In step S110, the vehicle management system 100 determines whether the battery electric vehicle 10 is turning. When the battery electric vehicle 10 is not turning (step S110: No), the vehicle management system 100 stops the output of the pseudo-squeal sound from the speaker 70 (step S120). Thus, in this case, only the pseudo-engine sound is output from the speaker 70. When the battery electric vehicle 10 is turning (step S110: Yes), the process moves to step S130.

In step S130, the vehicle management system 100 determines whether the vehicle speed of the battery electric vehicle 10 is equal to or higher than the specified speed. When the vehicle speed of the battery electric vehicle 10 is lower than the specified speed (step S130: No), the vehicle management system 100 stops the output of the pseudo-squeal sound from the speaker 70 (step S120). When the vehicle speed of the battery electric vehicle 10 is equal to or higher than the specified speed (step S130: Yes), the process moves to step S140.

In step S140, the vehicle management system 100 determines whether the yaw rate of the battery electric vehicle 10 is equal to or higher than the specified threshold value. When the yaw rate of the battery electric vehicle 10 is lower than the specified threshold value (step S140: No), the vehicle management system 100 stops the output of the pseudo-squeal sound from the speaker 70 (step S120). When the yaw rate of the battery electric vehicle 10 is equal to or higher than the specified threshold value, the vehicle management system 100 generates the pseudo-squeal sound and outputs the generated pseudo-squeal sound from the speaker 70 as superimposed on the pseudo-engine sound (step S150).

As has been described above, the vehicle management system 100 according to this embodiment outputs the pseudo-squeal sound from the speaker 70 as superimposed on the pseudo-engine sound. Here, the pseudo-squeal sound varies in response to the yaw rate of the battery electric vehicle 10. Thus, the sound output from the speaker 70 varies in response to both the driving state relating to the propulsive action of the battery electric vehicle 10 and the driving state relating to the turning action thereof. This allows the driver to feel both the driving state relating to the propulsive action and the driving state relating to the turning action by sound while driving the battery electric vehicle 10. As a result, the driver can better enjoy driving the battery electric vehicle 10 by sound.

3. Application to Battery Electric Vehicle Including Manual Mode (MT Mode)

An electric motor used as a motive power device for traveling in a common battery electric vehicle differs significantly in torque characteristics from an internal combustion engine that has been used as a motive power device for traveling in a conventional vehicle (CV). Due to the differences in torque characteristics between the motive power devices, while the CV requires a transmission, the battery electric vehicle generally does not include a transmission. Of course, common battery electric vehicles do not include a manual transmission (MT) that switches a gear ratio by a driver's manual operation. Thus, there is a significant difference in driving feeling between driving of a conventional vehicle with an MT (hereinafter referred to as an MT vehicle) and driving of a battery electric vehicle.

On the other hand, the torque of the electric motor can be relatively easily controlled by controlling a voltage or a field to be applied. Therefore, when appropriately controlled, the electric motor can achieve desired torque characteristics within the operation range of the electric motor. This feature can be taken advantage of to simulate the torque characteristics specific to the MT vehicle by controlling the torque of the battery electric vehicle. Further, for the driver to obtain a driving feeling as in the MT vehicle, the battery electric vehicle can be provided with a pseudo-gear change operation member with which a gear stage is selectable by simulating a gear change operation of a transmission. These arrangements make it possible to simulate the MT vehicle in the battery electric vehicle.

Specifically, the battery electric vehicle controls the output of the electric motor so as to simulate the driving characteristics (torque characteristics) specific to the MT vehicle. The driver performs a pseudo-gear change operation by operating the pseudo-gear change operation member. In response to the driver's pseudo-gear change operation, the battery electric vehicle varies the driving characteristics (torque characteristics) by simulating the MT. This allows the driver of the battery electric vehicle to obtain a feeling as if he or she were driving the MT vehicle. A control mode of the electric motor for thus simulating the driving characteristics and the gear change operation of the MT vehicle will be hereinafter referred to as the "manual mode" or the "MT mode."

The battery electric vehicle 10 according to this disclosure may include such a manual mode (MT mode). In the MT mode, the battery electric vehicle 10 generates the pseudo-engine sound according to the driver's driving operation and outputs the pseudo-engine sound from the speaker 70 by a control device 50. As the engine sound of the MT vehicle is recreated in addition to the driving operation of the MT vehicle, the satisfaction of a driver seeking reality increases.

In the following, configuration examples of the battery electric vehicle 10 including the manual mode (MT mode) will be described.

3.1 First Configuration Example (Sequential Shifter)

Figure 6:
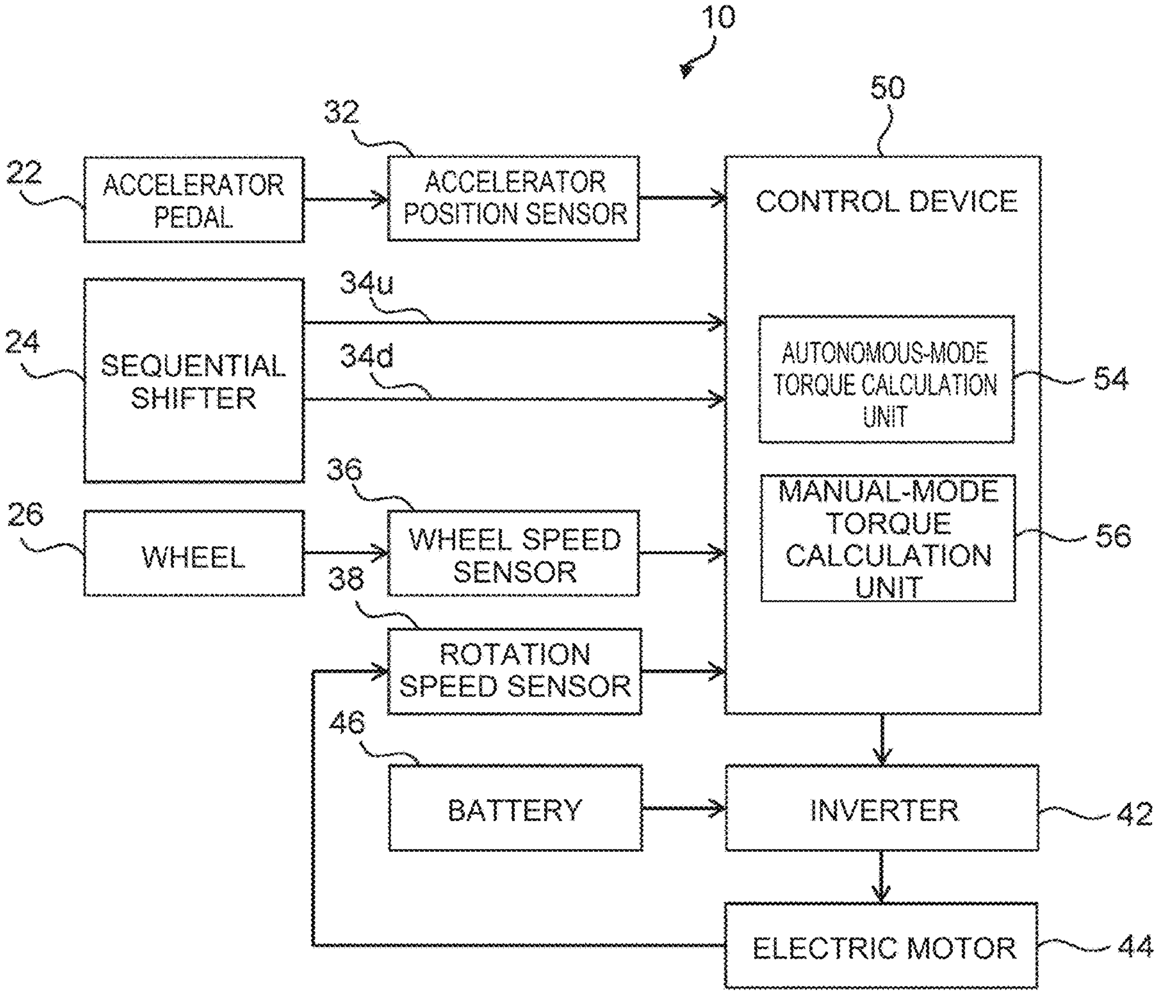
FIG. 6 is a block diagram showing a first configuration example of a motive power control system of the battery electric vehicle.

FIG. 6 is a block diagram showing a first configuration example of a motive power control system of the battery electric vehicle 10 according to this embodiment. The battery electric vehicle 10 includes the electric motor 44, a battery 46, and an inverter 42. The electric motor 44 is a motive power device for traveling. The battery 46 stores electric energy that drives the electric motor 44. Thus, the battery electric vehicle 10 is a battery-powered electric vehicle (BEV) that travels on the electric energy stored in the battery 46. The inverter 42 converts direct-current electricity input from the battery 46 during acceleration into electricity for driving the electric motor 44. Further, the inverter 42 converts regenerative electricity input from the electric motor 44 during deceleration into direct-current electricity and charges the battery 46 with this direct-current electricity.

The battery electric vehicle 10 includes an accelerator pedal 22 for the driver to input an acceleration request to the battery electric vehicle 10. The accelerator pedal 22 is provided with an accelerator position sensor 32 for detecting the accelerator operation amount.

The battery electric vehicle 10 includes a sequential shifter 24 as the pseudo-gear change operation member. The sequential shifter 24 may be a paddle type or a may be a lever type.

The paddle-type sequential shifter 24 is a dummy that is different from the original paddle-type shifter. The paddle-type sequential shifter 24 has a structure resembling a paddle-type shifter included in a clutch pedal-less MT vehicle. The paddle-type sequential shifter 24 is mounted on the steering wheel. The paddle-type sequential shifter 24 includes an upshift switch and a downshift switch for selecting a shift position. An upshift operation of pulling the upshift switch toward a near side causes the paddle-type sequential shifter 24 to give off an upshift signal 34*u*, and a downshift operation of pulling the downshift switch toward the near side causes it to give off a downshift signal 34*d*.

On the other hand, the lever-type sequential shifter 24 is a dummy that is different from the original lever-type shifter. The lever-type sequential shifter 24 has a structure resembling a lever-type shifter included in a clutch pedal-less MT vehicle. The lever-type sequential shifter 24 is configured such that an upshift operation of tilting a shift lever toward a front side leads to an output of an upshift signal 34*u*, and that a downshift operation of tilting the shift lever toward a rear side leads to an output of a downshift signal 34*d*.

A wheel 26 of the battery electric vehicle 10 is provided with a wheel speed sensor 36. The wheel speed sensor 36 is used as a vehicle speed sensor for detecting the vehicle speed of the battery electric vehicle 10. The electric motor 44 is provided with a rotation speed sensor 38 for detecting its rotation speed.

The battery electric vehicle 10 includes the control device 50. The control device 50 is typically an electronic control unit (ECU) installed in the battery electric vehicle 10. The control device 50 may be a combination of a plurality of ECUs. The control device 50 includes an interface, a memory, and a processor. An in-vehicle network is connected to the interface. The memory includes an RAM that temporarily records data, and an ROM that retains programs that can be executed by the processor and various pieces of data relating to the programs. Each program is composed of a plurality of instructions. The processor retrieves a program or data from the memory and executes the program to generate a control signal based on a signal acquired from each sensor.

For example, the control device 50 controls the electric motor 44 by PWM control of the inverter 42. Signals from the accelerator position sensor 32, the sequential shifter 24, the wheel speed sensor 36, and the rotation speed sensor 38 are input into the control device 50. The control device 50 processes these signals and calculates a motor torque command value for performing the PWM control of the inverter 42.

The control device 50 includes an autonomous mode (EV mode) and a manual mode (MT mode) as control modes. The autonomous mode is a normal control mode for driving the battery electric vehicle 10 as a common battery electric vehicle. The autonomous mode is programmed so as to continuously vary the output of the electric motor 44 according to an operation of the accelerator pedal 22. On the other hand, the manual mode is a control mode for driving the battery electric vehicle 10 like the MT vehicle. The manual mode is programmed so as to vary the output characteristics of the electric motor 44 relative to an operation of the accelerator pedal 22 according to an upshift operation and a downshift operation of the sequential shifter 24. Thus, the manual mode is a control mode in which the output of the electric motor 44 can be varied in response to a driving operation of a vehicle constituent element other than the accelerator pedal 22 and the brake pedal. The autonomous mode (EV mode) and the manual mode (MT mode) can be switched.

The control device 50 includes an autonomous-mode torque calculation unit 54 and a manual-mode torque calculation unit 56. These units 54, 56 may be each an independent ECU, or may be functions of the ECU that are obtained as a program recorded in the memory is executed by the processor.

The autonomous-mode torque calculation unit 54 includes a function of calculating a motor torque for the case of controlling the electric motor 44 in the autonomous mode. A motor torque command map is stored in the autonomous-mode torque calculation unit 54. The motor torque command map is a map that determines the motor torque from the accelerator operation amount and the rotation speed of the electric motor 44. A signal from the accelerator position sensor 32 and a signal from the rotation speed sensor 38 are input into parameters of the motor torque command map. A motor torque corresponding to these signals is output from the motor torque command map. In the autonomous mode, therefore, even when the driver operates the sequential shifter 24, this operation is not reflected on the motor torque.

The manual-mode torque calculation unit 56 includes an MT vehicle model. The MT vehicle model is a model for calculating a driving wheel torque that should be obtained by an operation of the accelerator pedal 22 and the sequential shifter 24 in the case where the battery electric vehicle 10 is assumed to be the MT vehicle.

Figure 7:
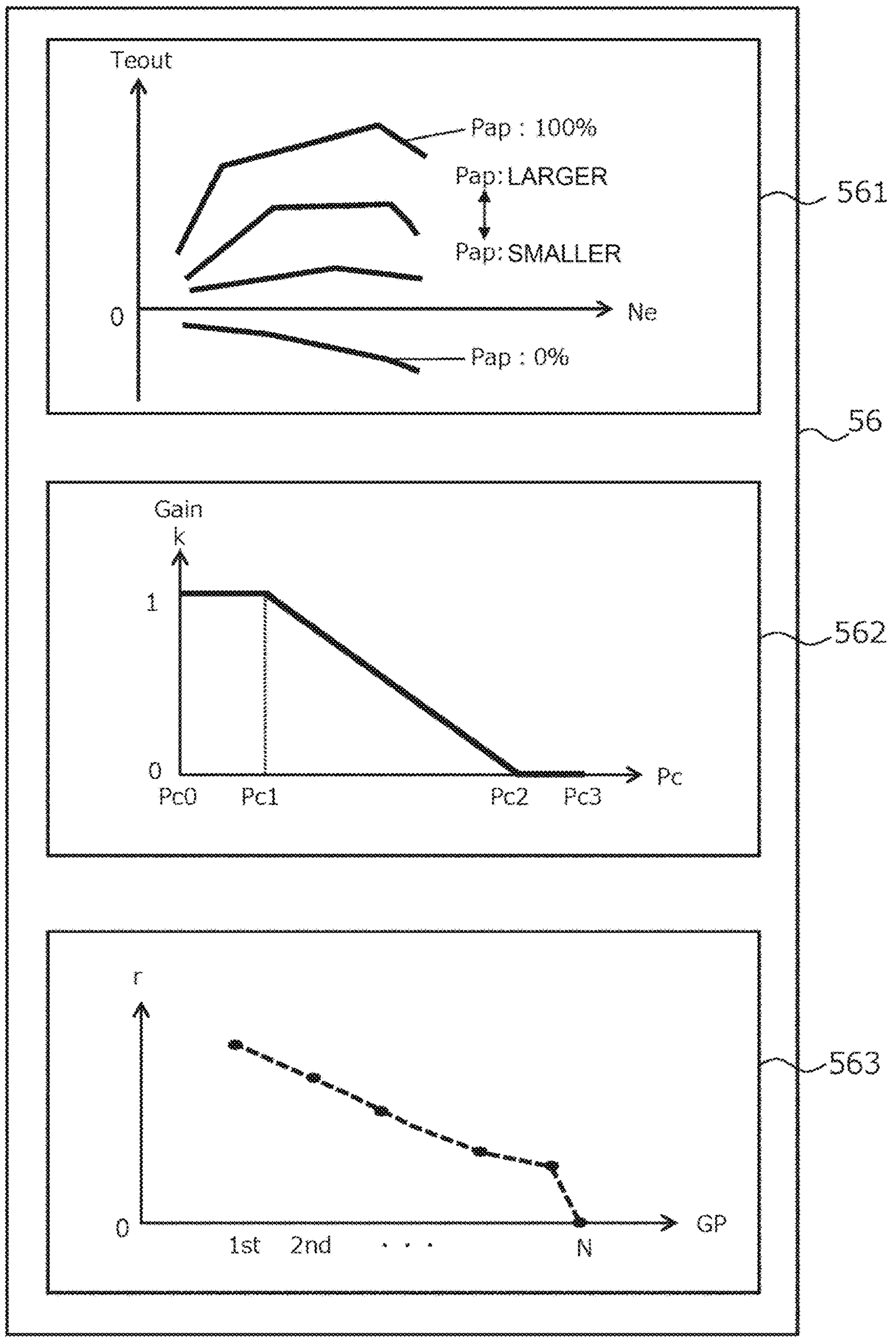
FIG. 7 is a view showing examples of respective models constituting an MT vehicle model.

The MT vehicle model included in the manual-mode torque calculation unit 56 will be described with reference to FIG. 7. As shown in FIG. 7, the MT vehicle model includes an engine model 561, a clutch model 562, and a transmission model 563. An engine, a clutch, and a transmission that are virtually realized by the MT vehicle model will be referred to as a virtual engine, a virtual clutch, and a virtual transmission, respectively. The engine model 561 is modeled on the virtual engine. The clutch model 562 is modeled on the virtual clutch. The transmission model 563 is modeled on the virtual transmission.

The engine model 561 calculates the virtual engine speed Ne and a virtual engine output torque Teout. The virtual engine speed Ne is calculated based on a rotation speed Nw of the wheel, a total deceleration ratio R, and a slip ratio Rslip of the virtual clutch. For example, the virtual engine speed Ne is expressed by the following Formula (1).

$$Ne = Nw \times R/(1 - Rslip) \quad \text{Formula (1)}$$

The virtual engine output torque Teout is calculated from the virtual engine speed Ne and an accelerator operation amount Pap. As shown in FIG. 7, for the calculation of the virtual engine output torque Teout, a map specifying relationships among the accelerator operation amount Pap, the virtual engine speed Ne, and the virtual engine output torque Teout is used. In this map, for each accelerator operation amount Pap, the virtual engine output torque Teout relative to the virtual engine speed Ne is given. The torque characteristics shown in FIG. 7 can be set to characteristics assuming a gasoline engine as well as can be set to characteristics assuming a diesel engine. Further, these torque characteristics can be set to characteristics assuming a naturally aspirated engine as well as can be set to characteristics assuming a supercharged engine.

The clutch model 562 calculates a torque transmission gain k. The torque transmission gain k is a gain for calculating a degree of torque transmission of the virtual clutch according to a virtual clutch opening degree Pc. The virtual clutch opening degree Pc is normally 0%, and is temporarily increased up to 100% in conjunction with switching of a virtual gear stage of the virtual transmission. The clutch model 562 has a map as shown in FIG. 7. In this map, the torque transmission gain k is given relative to the virtual clutch opening degree Pc. In FIG. 7, Pc0 corresponds to a position at which the virtual clutch opening degree Pc is 0%, and Pc3 corresponds to a position at which the virtual clutch opening degree Pc is 100%. The range from Pc0 to Pc1 and the range from Pc2 to Pc3 are dead bands where the torque transmission gain k does not vary depending on the virtual clutch opening degree Pc. The clutch model 562 calculates the clutch output torque Tcout using the torque transmission gain k. The clutch output torque Tcout is a torque output from the virtual clutch. For example, the clutch output torque Tcout is given as the product of the virtual engine output torque Teout and the torque transmission gain k (Tcout=Teout×k).

Further, the clutch model 562 calculates the slip ratio Rslip. The slip ratio Rslip is used for the calculation of the virtual engine speed Ne in the engine model 561. For the calculation of the slip ratio Rslip, as with the torque transmission gain k, a map in which the slip ratio Rslip is given relative to the virtual clutch opening degree Pc can be used.

The transmission model 563 calculates a gear ratio r. The gear ratio r is a gear ratio determined by a virtual gear stage GP in the virtual transmission. The virtual gear stage GP is raised by one stage as a result of an upshift operation of the sequential shifter 24. On the other hand, the virtual gear stage GP is lowered by one stage as a result of a downshift operation of the sequential shifter 24. The transmission model 563 has a map as shown in FIG. 7. In this map, the gear ratio r is given relative to the virtual gear stage GP such that the gear ratio r becomes lower as the virtual gear stage GP becomes higher. The transmission model 563 calculates a transmission output torque Tgout using the gear ratio r obtained from the map and the clutch output torque Tcout. For example, the transmission output torque Tgout is given as the product of the clutch output torque Tcout and the gear ratio r (Tgout=Tcout×r). The transmission output torque Tgout varies discontinuously according to switching of the gear ratio r. This discontinuous change in the transmission output torque Tgout causes a gear change shock, thus creating likeness of a vehicle including a stepped transmission.

The MT vehicle model calculates a driving wheel torque Tw using a predetermined deceleration ratio rr. The deceleration ratio rr is a fixed value determined by a mechanical structure from the virtual transmission to the driving wheels. The value obtained by multiplying the deceleration ratio rr by the gear ratio r is the aforementioned total deceleration ratio R. The MT vehicle model calculates the driving wheel torque Tw from the transmission output torque Tgout and the deceleration ratio rr. For example, the driving wheel torque Tw is given as the product of the transmission output torque Tgout and the deceleration ratio rr (Tw=Tgout×rr).

The control device 50 converts the driving wheel torque Tw calculated by the MT vehicle model into a required motor torque Tm. The required motor torque Tm is a motor torque required to realize the driving wheel torque Tw calculated by the MT vehicle model. For the conversion of the driving wheel torque Tw into the required motor torque Tm, a deceleration ratio from an output shaft of the electric motor 44 to the driving wheels is used. Then, the control device 50 controls the electric motor 44 by controlling the inverter 42 according to the required motor torque Tm.

Figure 8:
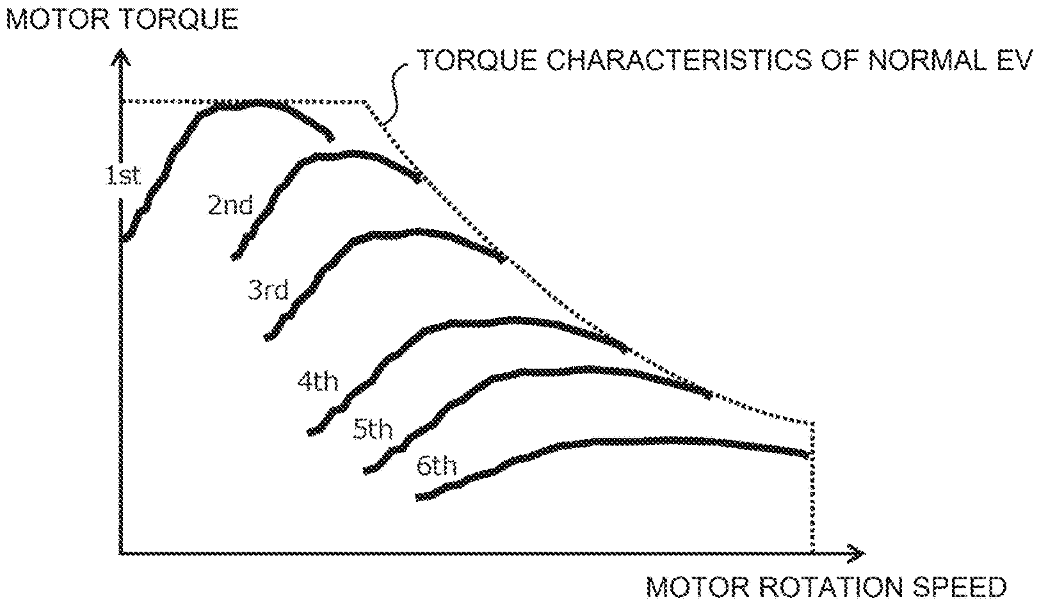
FIG. 8 is a view showing torque characteristics of an electric motor realized by motor control using the MT vehicle model.

FIG. 8 is a view showing the torque characteristics of the electric motor 44 realized by motor control using the MT vehicle model, as compared with the torque characteristics of the electric motor 44 realized by normal motor control in a battery electric vehicle (EV). As shown in FIG. 8, the motor control using the MT vehicle model can realize torque characteristics (solid lines in FIG. 8) that simulate the torque characteristics of the MT vehicle according to the virtual gear stage selected by the sequential shifter 24. In FIG. 8, the number of gear stages is six.

3.2 Second Configuration Example

Figure 9:
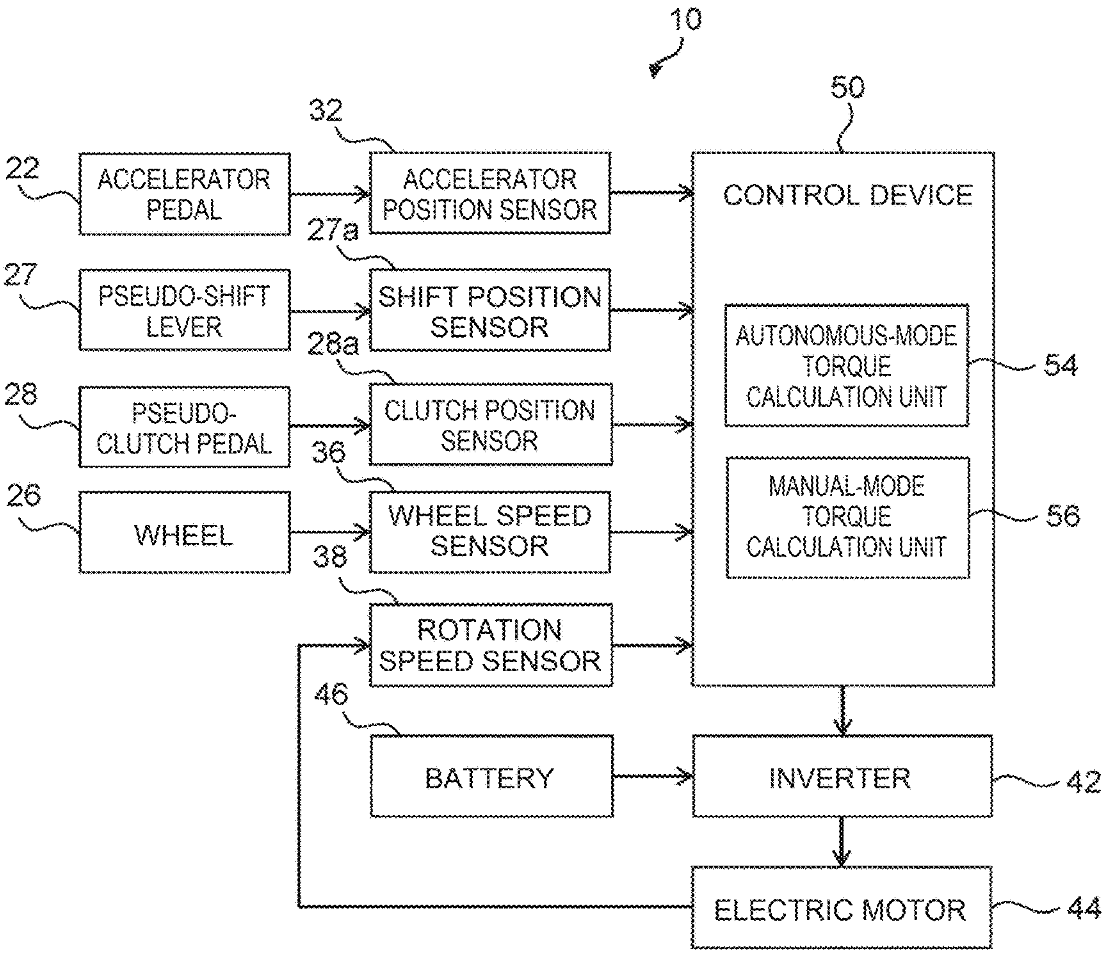
FIG. 9 is a block diagram showing a second configuration example of the motive power control system of the battery electric vehicle.

FIG. 9 is a block diagram showing a second configuration example of the motive power control system of the battery electric vehicle 10 according to this embodiment. Here, only those components that are different from those in the above-described first configuration example will be described. Specifically, in the second configuration example, the battery electric vehicle 10 includes a pseudo-shift lever (pseudo-shift device) 27 and a pseudo-clutch pedal 28 as pseudo-gear change operation members. The pseudo-shift lever 27 and the pseudo-clutch pedal 28 are no more than dummies different from the original shift lever and clutch pedal.

The pseudo-shift lever 27 has a structure simulating a shift lever included in the MT vehicle. The arrangement and the operation feeling of the pseudo-shift lever 27 are equivalent to those of the actual MT vehicle. Specifically, the pseudo-shift lever 27 is configured to allow arbitrary selection of a gear stage from among a plurality of gear stages. In the pseudo-shift lever 27, for example, positions corresponding to the respective gear stages of first gear, second gear, third gear, fourth gear, fifth gear, sixth gear, reverse, and neutral are provided. The pseudo-shift lever 27 is provided with a shift position sensor 27*a* that detects a gear stage by determining in which position the pseudo-shift lever 27 is.

The pseudo-clutch pedal 28 has a structure simulating a clutch pedal included in the MT vehicle. The arrangement and the operation feeling of the pseudo-clutch pedal 28 are equivalent to those of the actual MT vehicle. The pseudo-clutch pedal 28 is operated when the pseudo-shift lever 27 is operated. Specifically, when the driver wants to change the setting of the gear stage by the pseudo-shift lever 27, he or she stamps on the pseudo-clutch pedal 28 and, after changing the setting of the gear stage, stops stamping and returns the pseudo-clutch pedal 28 to its original position. The pseudo-clutch pedal 28 is provided with a clutch position sensor 28*a* for detecting an amount of stamping on the pseudo-clutch pedal 28.

Signals from the accelerator position sensor 32, the shift position sensor 27*a*, the clutch position sensor 28*a*, the wheel speed sensor 36, and the rotation speed sensor 38 are input into the control device 50. The control device 50 processes these signals and calculates the motor torque command value for performing the PWM control of the inverter 42.

As in the above-described first configuration example, the control device 50 includes an autonomous mode and a manual mode as control modes. The autonomous mode is programmed so as to continuously change the output of the electric motor 44 according to an operation of the accelerator pedal 22. On the other hand, the manual mode is a control mode for driving the battery electric vehicle 10 like the MT vehicle. The manual mode is programmed so as to vary the output and the output characteristics of the electric motor 44 relative to an operation of the accelerator pedal 22 according to an operation of the pseudo-clutch pedal 28 and the pseudo-shift lever (pseudo-shift device) 27. Thus, the manual mode is a control mode in which the output of the electric motor 44 can be varied in response to a driving operation of a vehicle constituent element other than the accelerator pedal 22 or the brake pedal.

The vehicle model included in the manual-mode torque calculation unit 56 is the same as that shown in FIG. 7. However, the virtual clutch opening degree Pc is replaced with the amount of stamping on the pseudo-clutch pedal 28 detected by the clutch position sensor 28*a*. The virtual gear stage GP is determined by the shift position of the pseudo-shift lever 27 detected by the shift position sensor 27*a*.

4. Output of Pseudo-Blipping Sound

As described above, the battery electric vehicle 10 can be configured to include the manual mode (MT mode). Here, the battery electric vehicle 10 includes a pseudo-gear change operation member, such as a sequential shifter. In the manual mode, the driver can perform a shift change (a change of the gear stage) simulating a gear change operation of a transmission by an operation of the pseudo-gear change operation member.

Incidentally, the driver can feel a change in the pseudo-engine sound in response to an operation of the accelerator pedal. If the driver can feel a change in the pseudo-engine sound in response to an operation of the pseudo-gear change operation member as well, the driver would be able to better enjoy driving the battery electric vehicle 10 by sound.

Therefore, when the battery electric vehicle 10 includes the pseudo-gear change operation member, the vehicle management system 100 according to this embodiment may be further configured such that the pseudo-engine sound output from the speaker 70 varies in response also to an operation of the pseudo-gear change operation member. More specifically, the vehicle management system 100 has a function of outputting a pseudo-blipping sound simulating a blipping sound from the speaker 70 when a shift change by an operation of the pseudo-gear change operation member is performed. In the following, the configuration of the vehicle management system 100 relating to this function will be described in detail.

Figure 10:
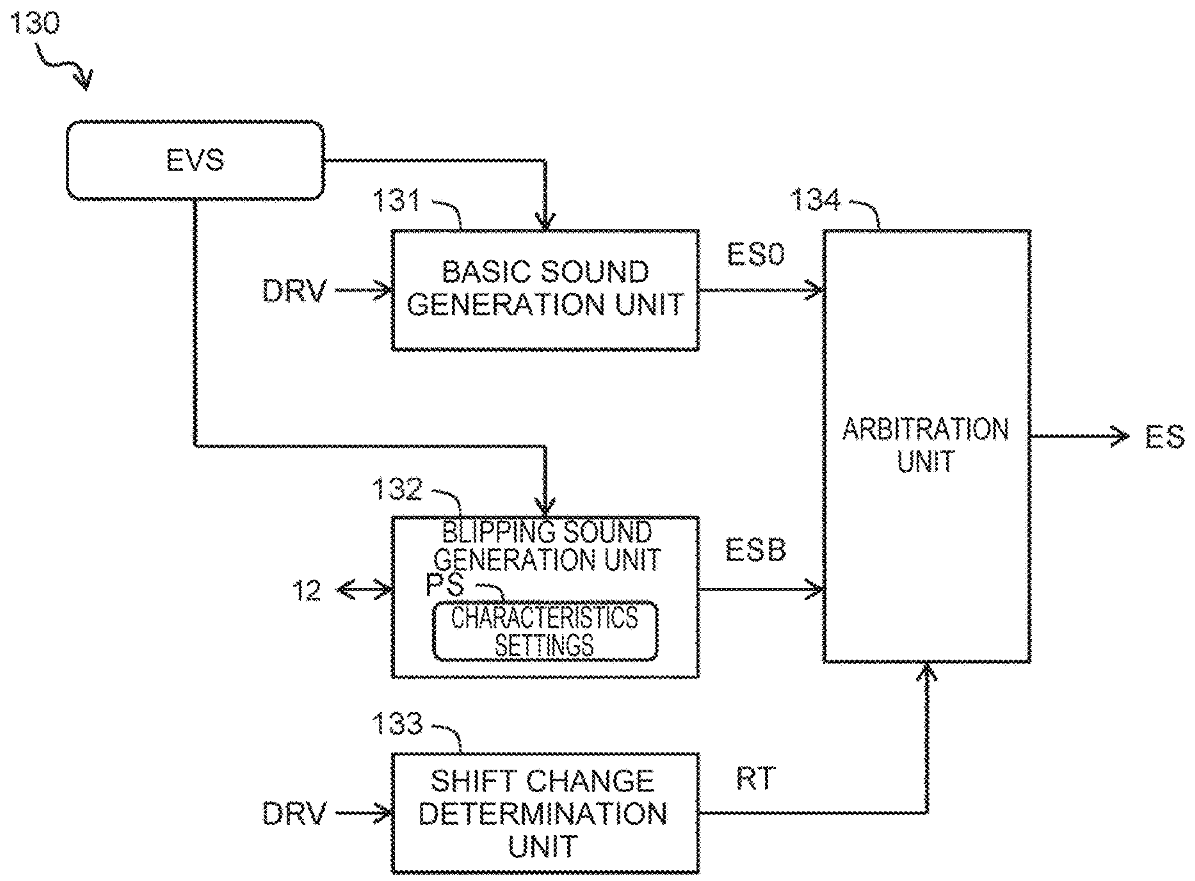
FIG. 10 is a block diagram showing an example of the functional configuration of the vehicle management system relating to a function of outputting a pseudo-blipping sound.

FIG. 10 is a block diagram showing an example of the functional configuration of the engine sound generation unit 130 relating to the function of outputting the pseudo-blipping sound. The engine sound generation unit 130 shown in FIG. 10 can be applied to the vehicle management system 100 of any of FIGS. 2 to 4. Thus, the vehicle management system 100 that realizes the function of outputting the pseudo-blipping sound can be configured.

In the example shown in FIG. 10, the engine sound generation unit 130 includes a basic sound generation unit 131, a blipping sound generation unit 132, a shift change determination unit 133, and an arbitration unit 134 as functional blocks. These functional blocks are realized by, for example, cooperation between the processor 101 that executes the vehicle management program 105 and the storage device 102.

The basic sound generation unit 131 generates a basic pseudo-engine sound. Therefore, the basic sound generation unit 131 may be configured to generate the pseudo-engine sound by the technique described with FIG. 2. Specifically, the basic sound generation unit 131 generates the basic pseudo-engine sound from the sound source data EVS based on the driving state relating to the propulsive action of the battery electric vehicle 10 (the accelerator operation amount, the vehicle speed, the virtual engine speed Ne, etc.). The basic sound generation unit 131 transmits basic engine sound data ES0 for reproducing the generated basic pseudo-engine sound to the arbitration unit 134.

The blipping sound generation unit 132 generates the pseudo-blipping sound. The blipping sound generation unit 132 manages characteristics settings PS relating to the characteristics (the sound pressure and the reproduction time) of the pseudo-blipping sound to be generated. Based on the characteristics settings PS, the blipping sound generation unit 132 generates the pseudo-blipping sound that mimics a blipping sound from the sound source data EVS. The blipping sound generation unit 132 is configured to receive a request for changing the characteristics settings PS from the user of the battery electric vehicle 10. Upon receiving a request from the user, the blipping sound generation unit 132 changes the characteristics settings PS in response to that request. For example, the HMI 12 is configured to receive an input of the value of either the sound pressure or the reproduction time of the pseudo-blipping sound from the user. When the user performs an input of the value, the blipping sound generation unit 132 changes the characteristics settings PS to the value input by the user. In this way, the blipping sound generation unit 132 varies the characteristics of the pseudo-blipping sound to be generated in response to a request from the user. Thus, the user who is the driver can adapt the pseudo-blipping sound to be output to his or her preference.

In the characteristics settings PS, the characteristics of the pseudo-blipping sound when an upshift is performed and the characteristics of the pseudo-blipping sound when a downshift is performed may be separately managed. Specifically, the characteristics settings PS may be managed such that the pseudo-blipping sound that is output when an upshift is performed and the pseudo-blipping sound that is output when a downshift is performed are different from each other. In particular, the characteristics settings PS may be changed so as to output the pseudo-blipping sound only when a downshift is performed. Thus, in this case, the pseudo-blipping sound is not output when an upshift is performed. This makes it possible to output the pseudo-blipping sound according to the case where a blipping sound is generated in the actual MT vehicle.

The blipping sound generation unit 132 transmits blipping sound data ESB for reproducing the generated pseudo-blipping sound to the arbitration unit 134.

The shift change determination unit 133 determines whether a shift change has been performed by an operation of the pseudo-gear change operation member. The shift change determination unit 133 acquires an operation state of the pseudo-gear change operation member from the driving state information DRV. For example, when the pseudo-gear change operation member is the sequential shifter 24, the driving state information DRV includes information on the upshift signal 34*u* or the downshift signal 34*d*. Then, upon the upshift signal 34*u* or the downshift signal 34*d* having been transmitted, the shift change determination unit 133 determines that a shift change has been performed. For example, when the pseudo-gear change operation member is the pseudo-shift lever 27 and the pseudo-clutch pedal 28, the driving state information DRV includes detection information of the shift position sensor 27*a*. Then, upon the shift position of the pseudo-shift lever 27 detected by the shift position sensor 27*a* having changed, the shift change determination unit 133 determines that a shift change has been performed. The shift change determination unit 133 transmits a determination result RT to the arbitration unit 134.

The arbitration unit 134 receives the basic engine sound data ES0 from the basic sound generation unit 131, and receives the blipping sound data ESB from the blipping sound generation unit 132. Further, the arbitration unit 134 acquires the determination result RT from the shift change determination unit 133. Based on the determination result RT, the arbitration unit 134 outputs either the basic engine sound data ES0 or the blipping sound data ESB as the engine sound data ES. The engine sound data ES is transmitted to the sound output control unit 140, and a sound based on the engine sound data ES is output from the speaker 70 by the sound output control unit 140. The arbitration unit 134 normally outputs the basic engine sound data ES0 as the engine sound data ES. Thus, normally, the basic pseudo-engine sound is output from the speaker 70. On the other hand, when the determination result RT shows that a shift change has been performed, the arbitration unit 134 outputs the blipping sound data ESB as the engine sound data ES. Thus, when a shift change has been performed, the pseudo-blipping sound is output from the speaker 70.

Figure 11:
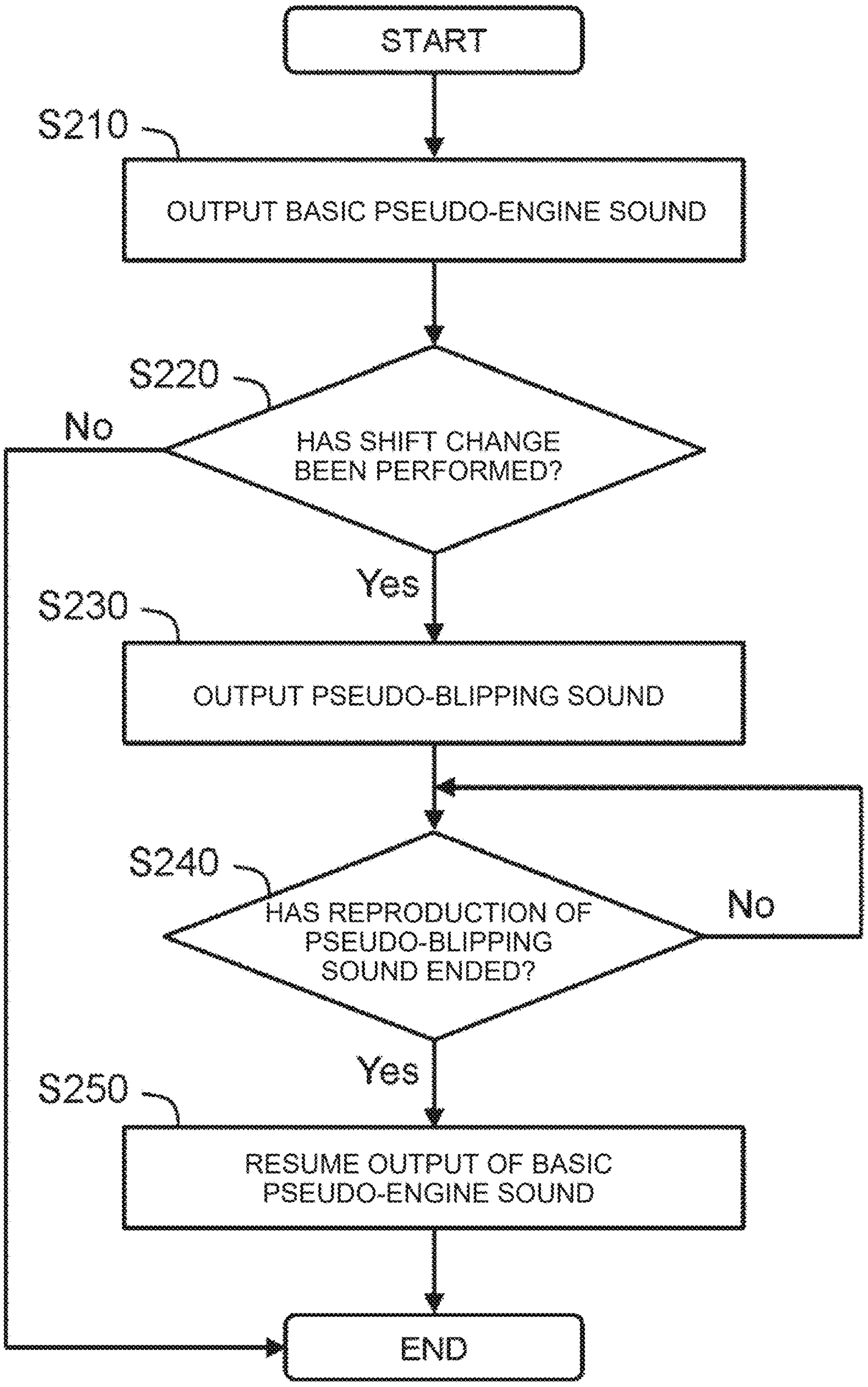
FIG. 11 is a flowchart showing one example of a processing flow of a process that the vehicle management system executes based on the functional configuration shown in FIG. 10.

Thus providing the functional configuration of the engine sound generation unit 130 can realize the function of outputting the pseudo-blipping sound. FIG. 11 is a flowchart showing one example of a processing flow of a process that is executed in the vehicle management system 100 based on the above-described functional configuration. The processing flow shown in FIG. 11 may be executed repeatedly on a predetermined processing cycle.

First, in a normal state, the vehicle management system 100 outputs the basic pseudo-engine sound from the speaker 70 (step S210).

The vehicle management system 100 is determining whether a shift change by an operation of the pseudo-gear change operation member has been performed (step S220). When a shift change has not been performed (step S220: No), the vehicle management system 100 ends the current process without outputting the pseudo-blipping sound. On the other hand, when a shift change has been performed (step S220: Yes), the vehicle management system 100 outputs the pseudo-blipping sound instead of the basic pseudo-engine sound (step S230).

The vehicle management system 100 continues the output of the pseudo-blipping sound until the reproduction of the pseudo-blipping sound ends (step S240). When the reproduction of the pseudo-blipping sound ends, the vehicle management system 100 resumes the output of the basic pseudo-engine sound (step S250).

As has been described above, the vehicle management system 100 can realize the function of outputting the pseudo-blipping sound. The pseudo-blipping sound is output when a shift change has been performed by an operation of the pseudo-gear change operation member. Thus, the driver can feel a change in the pseudo-engine sound in response also to an operation of the pseudo-gear change operation member. As a result, the driver can better enjoy driving the battery electric vehicle 10 by sound.

What is claimed is:

1. A vehicle management system applied to a battery electric vehicle including an electric motor as a driving source, the vehicle management system comprising one or more processors configured to generate a pseudo-engine sound and output the pseudo-engine sound from a speaker installed in the battery electric vehicle, wherein the one or more processors are configured to, when the battery electric vehicle turns, output from the speaker a sound effect that varies in response to a yaw rate of the battery electric vehicle as superimposed on the pseudo-engine sound, and wherein the one or more processors are configured to stop the output of the sound effect from the speaker when a predetermined condition is met, the predetermined condition being met when a vehicle speed of the battery electric vehicle is lower than a specified speed.

2. The vehicle management system according to claim 1, wherein the sound effect is a pseudo-squeal sound that simulates a squeal sound.

3. The vehicle management system according to claim 1, wherein the one or more processors are configured to make a sound pressure of the sound effect higher as the yaw rate of the battery electric vehicle becomes higher.

4. The vehicle management system according to claim 1, wherein the predetermined condition is further met when the yaw rate of the battery electric vehicle is lower than a specified threshold value.

5. The vehicle management system according to claim 4, wherein the one or more processors are configured to change at least one of the specified speed and the specified threshold value in response to a request from a user.

6. The vehicle management system according to claim 1, wherein:

the battery electric vehicle includes a pseudo-gear change operation member with which a gear stage is selectable by simulating a gear change operation of a transmission; and the one or more processors are configured to, when a shift change by an operation of the pseudo-gear change operation member is performed, output a pseudo-blipping sound simulating a blipping sound from the speaker.

7. The vehicle management system according to claim 6, wherein the one or more processors are configured to change a characteristic of the pseudo-blipping sound in response to a request from a user.

8. A battery electric vehicle including an electric motor as a driving source, the battery electric vehicle comprising:

a speaker; and one or more processors configured to generate a pseudo-engine sound and output the pseudo-engine sound from the speaker, wherein the one or more processors are configured to, when the battery electric vehicle turns, output from the speaker a sound effect that varies in response to a yaw rate of the battery electric vehicle as superimposed on the pseudo-engine sound, and wherein the one or more processors are configured to stop the output of the sound effect from the speaker when a predetermined condition is met, the predetermined condition being met when a vehicle speed of the battery electric vehicle is lower than a specified speed.

9. The battery electric vehicle according to claim 8, wherein the sound effect is a pseudo-squeal sound that simulates a squeal sound.

10. The battery electric vehicle according to claim 8, further comprising a pseudo-gear change operation member that allows selection of a gear stage by simulating a gear change operation of a transmission, wherein the one or more processors are configured to output a pseudo-blipping sound simulating a blipping sound from the speaker when a shift change by an operation of the pseudo-gear change operation member is performed.

11. The battery electric vehicle according to claim 10, wherein:

the one or more processors include a manual mode simulating driving characteristics of a manual transmission vehicle as a control mode; and in the manual mode, the one or more processors are configured to vary an output characteristic of the electric motor relative to an operation of an accelerator pedal according to the gear stage selected by the pseudo-gear change operation member.

12. The battery electric vehicle according to claim 11, wherein the pseudo-gear change operation member includes a sequential shifter with which the gear stage is selected by an upshift operation and a downshift operation.

13. The battery electric vehicle according to claim 11, wherein the pseudo-gear change operation member includes a pseudo-shift device with which the gear stage is arbitrarily selected from among a plurality of gear stages, and a pseudo-clutch pedal that simulates an operation of a clutch of a transmission and is operated when the pseudo-shift device is operated.

* * * * *